US008384776B2

(12) United States Patent
Dolgov et al.

(10) Patent No.: US 8,384,776 B2
(45) Date of Patent: Feb. 26, 2013

(54) DETECTION OF TOPOLOGICAL STRUCTURE FROM SENSOR DATA WITH APPLICATION TO AUTONOMOUS DRIVING IN SEMI-STRUCTURED ENVIRONMENTS

(75) Inventors: Dmitri A. Dolgov, Ann Arbor, MI (US); Sebastian Thrun, Stanford, CA (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 980 days.

(21) Appl. No.: 12/428,222

(22) Filed: Apr. 22, 2009

(65) Prior Publication Data

US 2010/0274430 A1    Oct. 28, 2010

(51) Int. Cl.
*H04N 7/00* (2006.01)
(52) U.S. Cl. .......................................... 348/116; 701/25
(58) Field of Classification Search .................. None
See application file for complete search history.

(56) References Cited

U.S. PATENT DOCUMENTS

| | | | |
|---|---|---|---|
| 5,155,683 A | 10/1992 | Rahim | |
| 5,991,427 A | 11/1999 | Kakinami et al. | |
| 6,205,234 B1 | 3/2001 | Kakinami et al. | |
| 6,385,539 B1 | 5/2002 | Wilson et al. | |
| 6,510,382 B2 | 1/2003 | Wilson | |
| 6,529,806 B1 | 3/2003 | Licht | |
| 6,674,434 B1 | 1/2004 | Chojnacki et al. | |
| 6,694,233 B1 | 2/2004 | Duff et al. | |
| 2005/0159879 A1 | 7/2005 | De Graeve et al. | |
| 2006/0149782 A1 | 7/2006 | Yeh et al. | |
| 2007/0027612 A1* | 2/2007 | Barfoot et al. | 701/117 |
| 2007/0084655 A1 | 4/2007 | Kakinami et al. | |
| 2007/0156286 A1 | 7/2007 | Yamauchi | |
| 2008/0009966 A1 | 1/2008 | Bruemmer et al. | |
| 2008/0262721 A1 | 10/2008 | Guo et al. | |

OTHER PUBLICATIONS

Dmitri Dolgov, Sebastian Thrun, Michael Montemerlo, James Diebel: Path Planning for Autonomous Driving in Unknown Environments. ISER 2008: 55-64.*
Ellips Masehian, M.R.Amin-Naseri: A Voronoi Diagram—Visibility Graph—Potential Field Compound Algorithm for Robot Path Planning, Journal of Robotic Systems 21(6) 2004, pp. 275-300.*
Springer, "*The 2005 DARPA Grand Challenge: The Great Robot Race*," 2005.
Special issue on the 2007 DARPA urban challenge, part I. *Journal of Field Robotics*, vol. 25, No. 8, pp. 423-566, Aug. 2008.
Special issue on the 2007 DARPA urban challenge, part II. *Journal of Field Robotics*, vol. 25, No. 8, pp. 423-566, Aug. 2008.

(Continued)

*Primary Examiner* — Sath V Perungavoor
*Assistant Examiner* — Kate Luo
(74) *Attorney, Agent, or Firm* — Oblon, Spivak, McClelland, Maier & Neustadt, L.L.P.

(57) ABSTRACT

A method of creating an obstacle-free diagram using topological sensor data to form a graph corresponding to a driving path, transforming the graph using discrete heuristics, locally smoothing a plurality of edges of the graph after the transforming, and globally smoothing the graph after the locally smoothing. Transforming includes deleting an edge of the graph, merging two intersections of the graph into a single intersection, and collapsing a plurality of edges forming a loop into a single edge. Locally smoothing includes smoothing a lane segment of the graph by minimizing a sum of a function of smoothness and a function of distance. Globally smoothing includes defining an intersection potential and minimizing a sum of the function of smoothness, the function of distance, a function of intersections and a function of direction.

18 Claims, 17 Drawing Sheets

OTHER PUBLICATIONS

Brock, O. et al., "High-speed navigation using the global dynamic window approach." *International Conference on Robotics and Automation (ICRA)*, 1999.

Dickmanns, E. D. et al., "Autonomous high speed road vehicle guidance by computer vision," *Triennial World Congress of the International Federation of Automatic Control*, vol. 4, pp. 221-226, Jul. 1987.

Dolgov, Dmitri et al., "Detection of principal directions in unknown environments for autonomous navigation," *Proceedings of the Robotics: Science and Systems (RSS-08)*, Zurich, Switzerland, Jun. 2008.

A. Kelly, "An intelligent predictive control approach to the high speed cross country autonomous navigation problem," 1995.

Kolski, Sascha et al., "Autonomous driving in structured and unstructured environments," *IEEE Intelligent Vehicles Symposium*, 2006.

Montemerlo, Michael et al., "Junior: The stanford entry in the urban challenge," *Journal of Field Robotics*, vol. 25, No. 9, pp. 569-597, 2008.

Singh, Sanjiv et al., "Recent progress in local and global traversability for planetary rovers," *Proceedings of the IEEE International Conference on Robotics and Automation*, 2000. IEEE, Apr. 2000.

Stentz, Anthony (Tony) et al., "A complete navigation system for goal acquisition in unknown environments," Proceedings 1995 IEEE/RSJ International Conference on Intelligent Robotic Systems (IROS '95), vol. 1, pp. 425-432, Aug. 1995.

Thorpe, C. et al., "Automated highway and the free agent demonstration. In Robotics Research—International Symposium," vol. 8, 1998.

Tsugawa, S. et al. "Super smart vehicle system, its concept and preliminary works," Vehicle Navigation and Information Systems, vol. 2, pp. 269-277, Oct. 1991.

Varaiya, P., "Smart cars on smart roads: Problems of control," IEEE Transactions on Automatic Control, vol. 38, No. 2, Feb. 1993.

\* cited by examiner

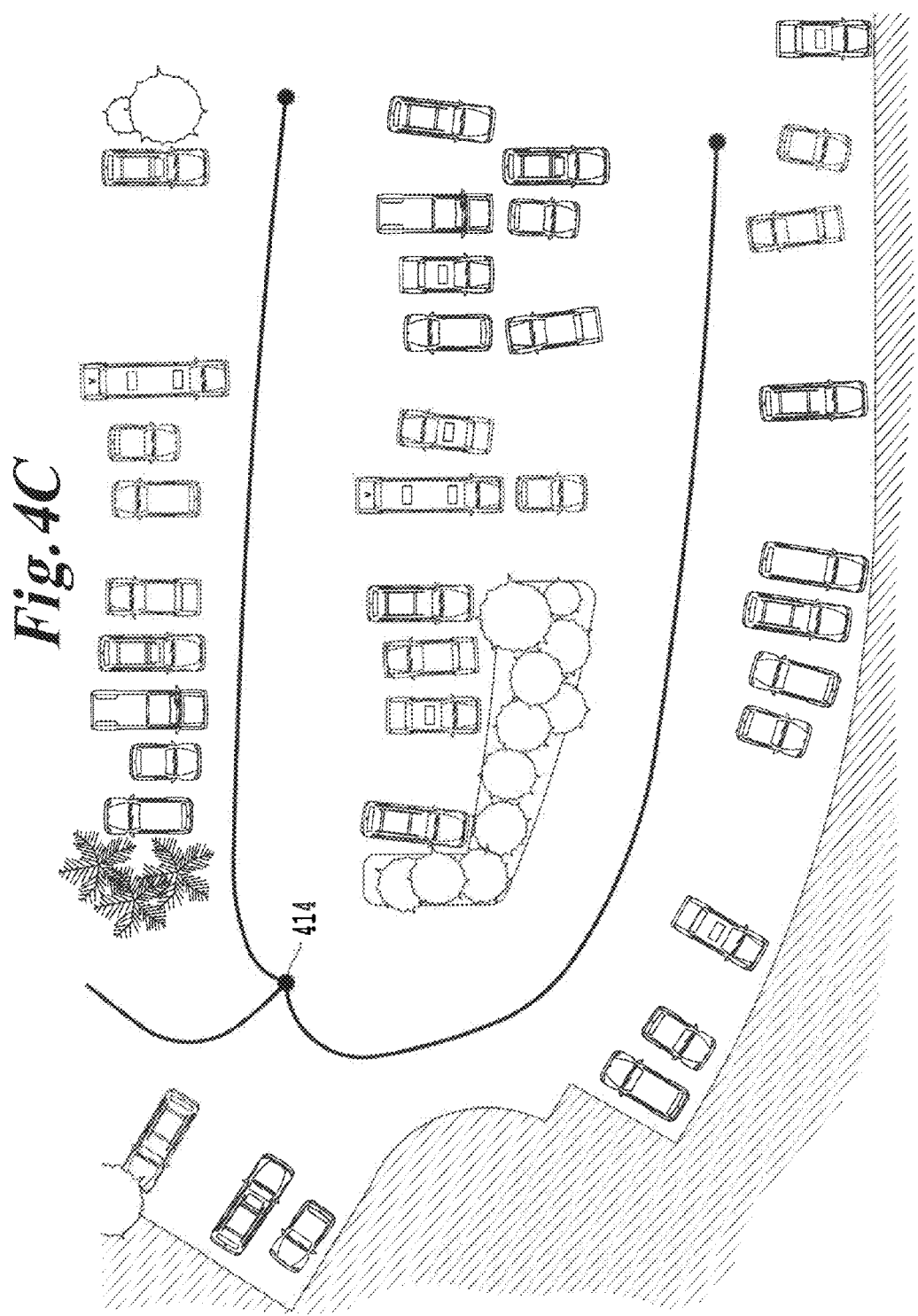

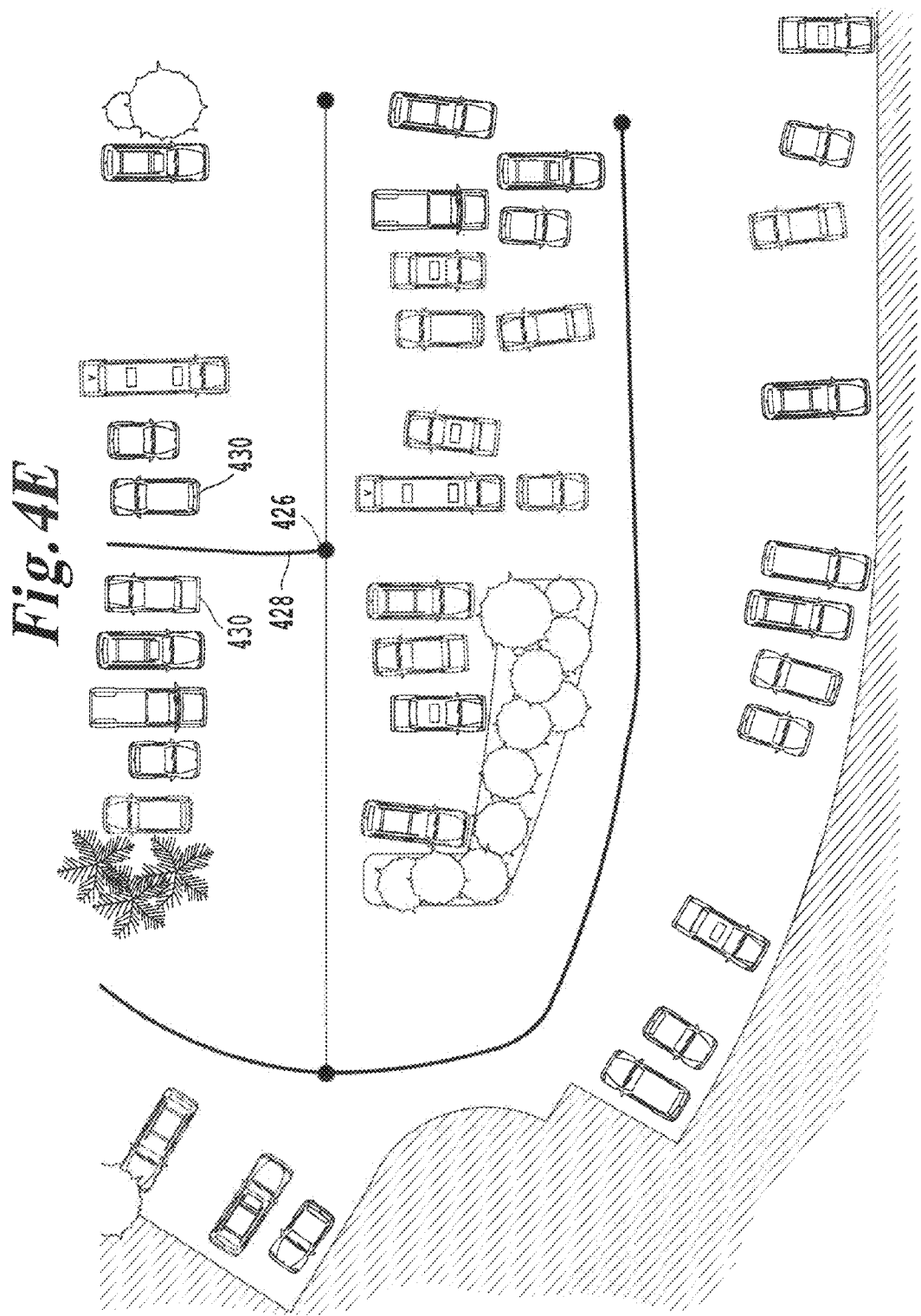

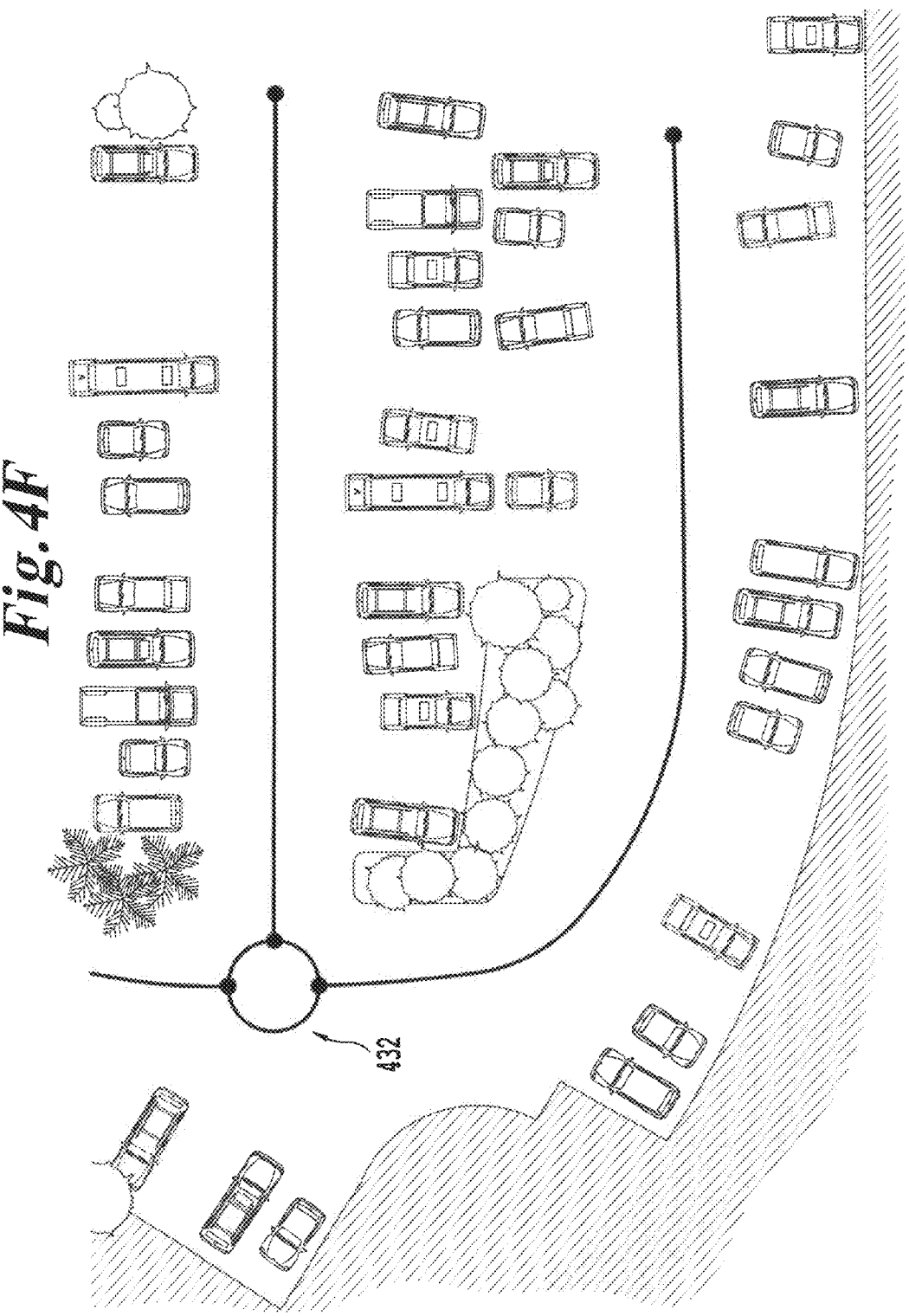

DETECTION OF TOPOLOGICAL STRUCTURE FROM SENSOR DATA WITH APPLICATION TO AUTONOMOUS DRIVING IN SEMI-STRUCTURED ENVIRONMENTS

FIELD OF THE INVENTION

The invention relates to methods and systems of autonomous navigation of topological structure in semi-structured environments such as parking lots.

BACKGROUND OF THE INVENTION

Autonomous driving is a long-standing problem in robotics, as discussed in Springer, "The 2005 DARPA Grand Challenge: The Great Robot Race," 2005; "Special issue on the 2007 DARPA urban challenge, part I," Journal of Field Robotics, 25(8):423-566, August 2008; and "Special issue on the 2007 DARPA urban challenge, part II," Journal of Field Robotics, 25(8):423-566, August 2008. Existing work in autonomous driving focuses either on highly structured environments, such as highways or city streets, or on unstructured off-road driving.

E D Dickmanns and A Zapp, "Autonomous high speed road vehicle guidance by computer vision. Triennial World Congress of the International Federation of Automatic Control," 4:221-226, July 1987; C. Thorpe, T. Jochem, and D. Pomerleau, "Automated highway and the free agent demonstration," In Robotics Research—International Symposium, volume 8, 1998; S Tsugawa, N Watanabe, and H. Fujii, "Super smart vehicle system-Its concept and preliminary works," Vehicle Navigation and Information Systems, 2:269-277, October 1991; and P. Varaiya, "Smart cars on smart roads: Problems of control," IEEE Transactions on Automatic Control, 38(2), February 1993, each describe autonomous driving for structured driving environments.

On the other hand, A. Kelly, "An intelligent predictive control approach to the high speed cross country autonomous navigation problem," 1995; Sascha Kolski, David Ferguson, Mario Bellino, and Roland Siegwart, "Autonomous driving in structured and unstructured environments," IEEE Intelligent Vehicles Symposium, 2006; O. Brock and O. Khatib, "High-speed navigation using the global dynamic window approach," International Conference on Robotics and Automation (ICRA), 1999; Sanjiv Singh, Reid Simmons, Trey Smith, Anthony (Tony) Stentz, Vandi Verma, Alex Yahja, and Kurt Schwehr, "Recent progress in local and global traversability for planetary rovers," Proceedings of the IEEE International Conference on Robotics and Automation, 2000, IEEE, April 2000; Anthony (Tony) Stentz and Martial Hebert, "A complete navigation system for goal acquisition in unknown environments," Proceedings 1995 IEEE/RSJ International Conference On Intelligent Robotic Systems (IROS '95), volume 1, pages 425-432, August 1995; and Springer, "The 2005 DARPA Grand Challenge: The Great Robot Race," 2005, each provide background of unstructured off-road autonomous driving.

In structured environments, there is typically a topological graph (i.e., a lane-network graph) imposed on the environment, and the vehicle is constrained to drive on the graph with only small deviations admissible. In the case of unstructured driving, however, the robot is not constrained by a lane-network graph and is free to choose any path, subject to safety and kinodynamic constraints.

SUMMARY OF EXEMPLARY ASPECTS OF THE ADVANCEMENTS

There are many additional environments which are semi-structured and have a natural lane-network graph. This lane-network graph may not be predefined and stored in the robot's memory prior to travel. However, collision-free maneuvers off the graph are likely preferable in comparison to maneuvers on the graph. Such driving conditions are common and arise, for example, in parking lots and garages, construction zones, and around shopping centers. For instance, a more time or distance efficient driving path may be obtained by planning a driving path which substantially deviates from a lane-network graph while performing maneuvers such as turning around, pulling in and out of parking spaces, avoiding other cars, etc.

In one aspect, a method of creating an obstacle-free diagram using topological sensor data to form a graph corresponding to a driving path is provided. In particular, an obstacle-free diagram using sensor data gathered from a topological sensor configured to detect obstacles within a surrounding environment is created. The method further includes forming a graph from the obstacle-free diagram which corresponds to a driving path of the surrounding environment and recording the graph onto electronic memory, transforming the graph using a processor to apply discrete heuristic transformations to the graph, locally smoothing a plurality of edges of the graph after the transforming, and globally smoothing the graph after the locally smoothing. In a preferred aspect, the obstacle-free diagram is a generalized Voronoi diagram.

In another aspect, the transforming includes deleting an edge of the graph, merging two intersections of the graph into a single intersection, and collapsing a plurality of edges forming a loop into a single edge.

In a further aspect, the locally smoothing includes smoothing a lane segment of the graph by minimizing a sum of a function of smoothness and a function of distance, whereas the globally smoothing includes defining an intersection potential and minimizing a sum of the function of smoothness, the function of distance, a function of intersections and a function of direction.

In yet a further aspect, the method includes creating a lane network of the graph after the globally smoothing by imposing two lanes substantially equidistant and parallel to the graph and then displaying the lane network in a display device such as a touch screen LCD display.

BRIEF DESCRIPTION OF THE DRAWINGS

In the following description, the invention is explained in more detail in relation to the accompanying drawings, in which:

FIGS. 4A-4F illustrate examples of statistical processing of the systematic process illustrated in FIGS. 3A-3D;

DETAILED DESCRIPTION OF THE INVENTION

Figure 1:
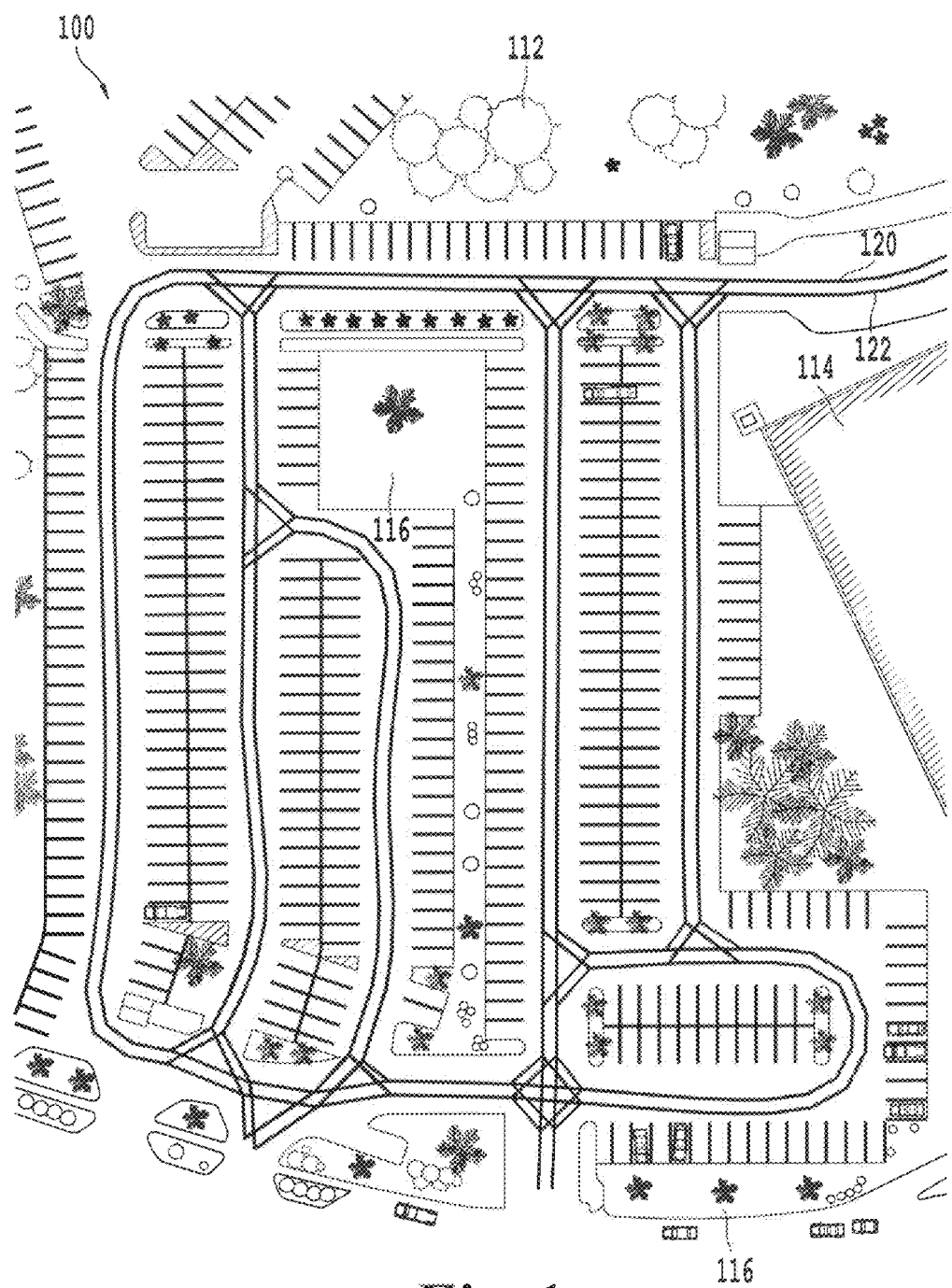
FIG. 1 depicts an example of a lane-network graph automatically constructed from sensor data obtained while driving through a parking lot.

A problem in navigating an autonomous robot through semi-structured environments is perceptual. The robot both senses its surroundings at a low level (detecting drivable and non-drivable terrain), but also perceives the world at a higher level and infers the topological structure of the environment. An objective of this invention is to address a problem of estimating topological structure from sensor data and present an algorithm for automatically constructing lane-network graphs. FIG. 1 depicts an example of a lane-network graph 100 automatically constructed from sensor data obtained while driving through a parking lot.

In estimating a topological structure of an environment from sensor data, a grid-based map of static obstacles (such as trees 112, building structure 114 and obstacles 116) is built and then the grid-based map is used to estimate a likely corresponding graph of drivable lanes 120 and 122 (the lane network). It should be appreciated the grid-based map is a computer generated depiction of a static obstacle map and the quality of such effects a final estimate of the topological structure of the environment. Although the graph 100 is depicted as a computer generated model, it should be appreciated that in the alternative, a photographic image or the like can be optionally used. In such, a first layer to the map is created using a bird's eye view of an area, for example a satellite or airplane photographic image. Then, a second layer of lanes are drawn onto the first layer using an obstacle map of sensor data representing the topological structure of the area.

In creating this second layer or creating the obstacle map of sensor data representing the topological structure of the area, a static mapper based on a perception algorithm is used. For example, the obstacle map is created using a perception algorithm and corresponding sensor hardware based on Montemerlo et al., "Junior: The Stanford entry in the urban challenge," Journal of Field Robotics, 25(9):569-597, 2008 (Junior), which is incorporated herein by reference. The core of Junior's perception maintains a fixed-size obstacle grid around the robot, where each cell is labeled by applying several heuristics to the 3D point cloud generated by 3D light detection and ranging (LiDAR).

In the mapper used in an exemplary aspect of the invention, for every cell in the grid, statistics are accumulated on how many times the cell has been within the observation range, contained an obstacle, contained the ground plane, and was ray-traced through. A measurement of a height of an obstacle is retained to compensate for a tendency of lower obstacles to have a lower detection rate and thus being likely to be ray-traced through. Then, a classifier is used to identify each labeled cell as free or occupied as a function of these features. Several classifiers (both manually tuned and automatically learned) are used. It was determined a cascade of simple linear classifiers worked well.

Figure 2A:
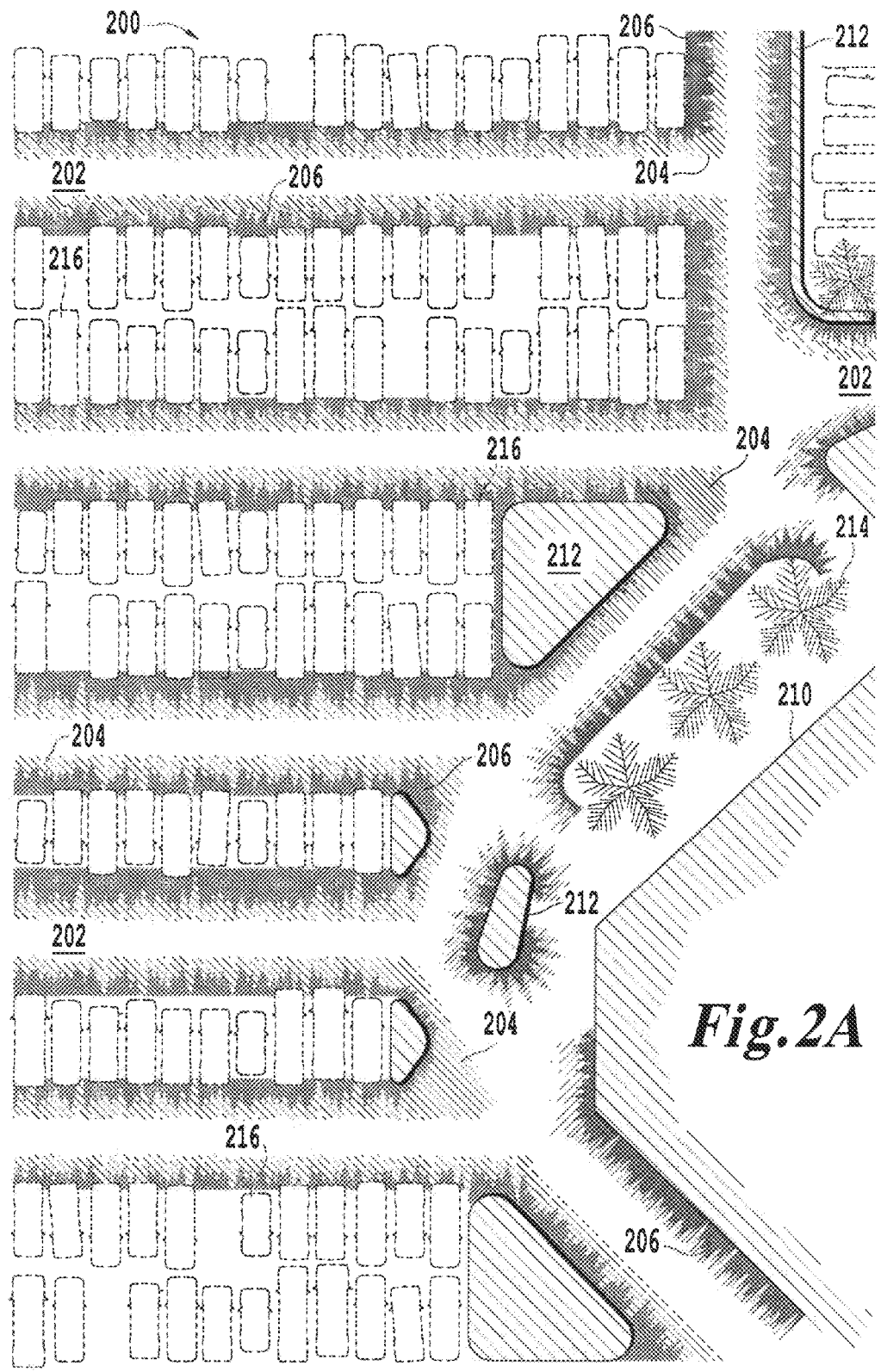
FIGS. 2A and 2B illustrate a grid-based mapping approach for a parking lot.
Figure 2B:
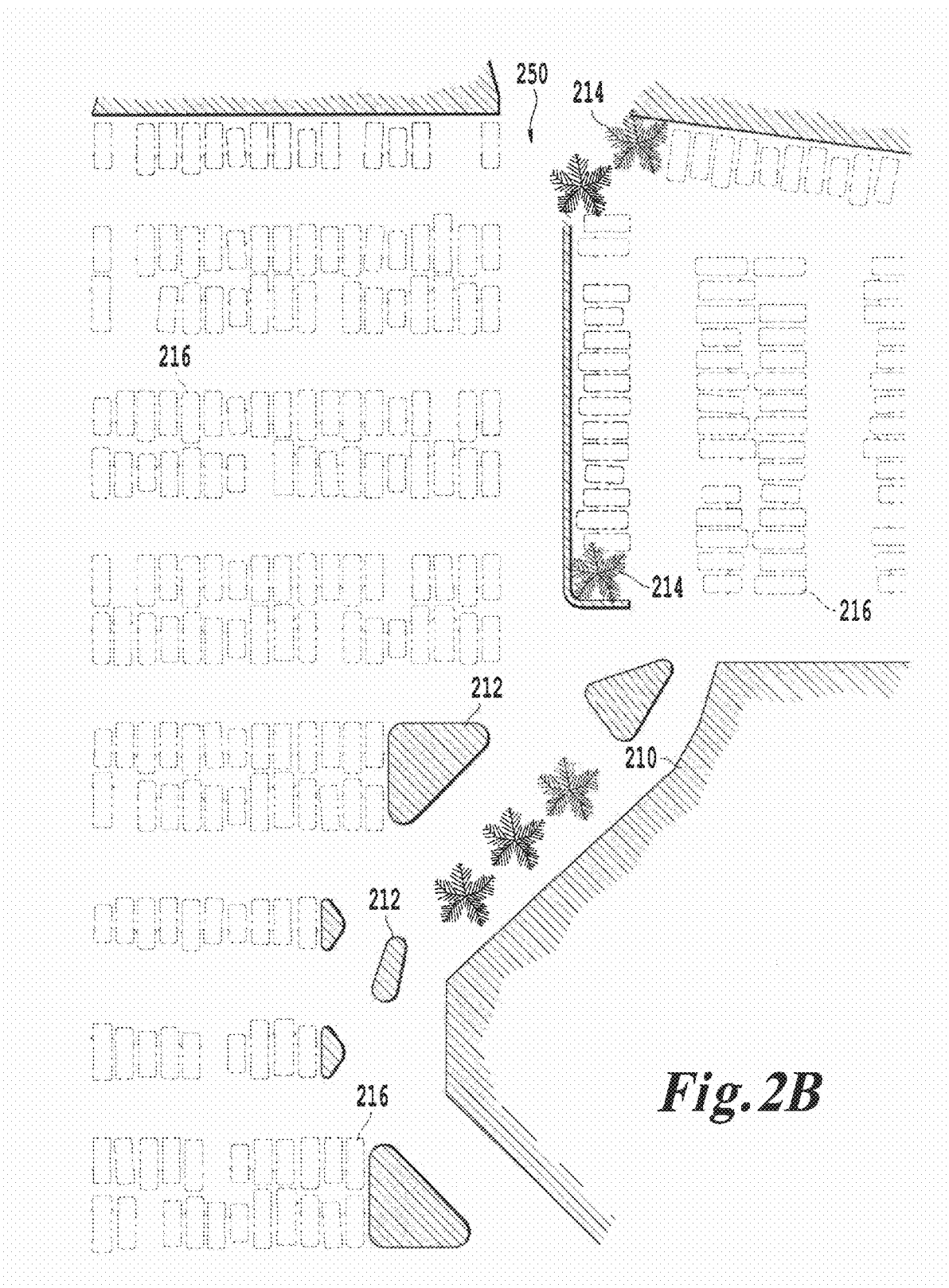

FIGS. 2A and 2B illustrate an exemplary grid-based mapping approach for a parking lot. In particular, FIG. 2A shows the accumulated statistics for the environment as gathered using sensors and FIG. 2B shows the output of the classifier. In some aspects, the accumulated statistics will render and classify each grid on a scale of preferred to un-passable driving paths.

The statistics are acquired using a sensor-equipped vehicle, which include various types of sensors including laser, optical/visual, radar, sonar, 3D LiDAR, etc., to detect topological features of the environment. The statistical information is then rendered to create a visual representation 200 as shown in FIG. 2A. Of the visual representation 200, the preferred driving area 202 represents an area which is not detected to contain topological structure by the sensors, and thus preferred driving area 202 represents a traversable area. The caution areas 204 indicate areas statistically probable to contain topological structures, obstacles likely to impede vehicular traffic or a close proximity to such obstacles. The unpassable areas 206 indicate areas statistically determined to contain topological impediments, and thus indicate areas likely to result in a collision if traversed. The other objects of the representation 200, such as the building 210, curbs 212, trees 214 and vehicles 216, are included for perspective and do not directly reflect statistical data gathered from the sensors.

The statistical data is then processed to create a topographical map 250 as shown in FIG. 2B. The map 250 shows a larger or wider-angled view of the parking lot depicted by the representation 200 of FIG. 2A. The map 250 identifies topological structures such as the building 210, curbs 212, trees 214 and vehicles 216. It should be appreciated the map 250 is a more constructed depiction of the topological features of the parking lot than is required, but using well-structured objects as portrayed in FIGS. 2A and 2B assists in describing the path planning discussed below.

A primary objective of the invention is to use a grid-based obstacle map, such as the map 250 depicted in FIG. 2B, to create a topological lane-network graph which accurately fits the grid-based obstacle map. According to an exemplary aspect of the invention, a first step to accomplish this objective is to estimate a 2D graph of the center-line of the lane network and then estimate two-way traffic driving lanes around this center-line graph. Then, the probabilistically most likely topological center-line graph corresponding to an observed discrete obstacle grid is determined.

Figure 3A:
FIGS. 3A-3D illustrate a systematic processing of a Generalized Voronoi Diagram for a parking lot.
Figure 3B:
Figure 3C:
Figure 3D:

This process is depicted in FIGS. 3A-3D. In FIG. 3A, a 2D graph 300 is imposed on the map 250. The graph 300 is a Generalized Voronoi Diagram, which is preferred, but it should be appreciated the graph 300 can be created using alternative methods, including other geometric approaches, to create an obstacle-free path/diagram. Once the graph 300 is created and imposed on the map 250, graph simplification and pruning is performed, and the edges 302 are locally smoothed while holding the intersections 304 fixed, resulting in the graph 310 shown in FIG. 3B. The next step includes global smoothing, iteratively, while updating continuity/discontinuity potentials across the intersections 304, resulting in the graph 320 illustrated in FIG. 3C. Then, the driving lane network 330 is imposed on map 250 as illustrated in FIG. 3D. This process is described in more detail below.

In performing a process according to an exemplary aspect of the present invention, a potential is defined which encodes how networks of driving lanes are laid out, including connectivity, smoothness, curvature, width, etc. Further, a potential is defined which models how well a lane network fits a given obstacle map, such as distance to obstacles, directional alignment, etc. Then, an appropriate inference technique to estimate the most likely lane network, given the observed obstacle map, is applied.

In an embodiment, an obstacle map $O=\langle o_x, o_y \rangle$ is defined as a collection of 2D points, and a center-line graph $G=\langle V, E \rangle$ is defined as having vertices V and edges E. Additionally, a set of intersection nodes $I \in V$ is defined as consisting of nodes having less than 2 neighbors (e.g., dead-ends or orphans) or more than 2 neighbors (intersections). Lane segments $S \in V$ are defined as a collection of connected nodes between two intersections.

Given an obstacle map O and a center-line graph G, the following potential is used in an embodiment:
$f(G,O)=w_{sm}f_{sm}(S)+w_{in}f_{in}(I)+w_{dir}f_{dir}(S,O)+w_{dist}f_{dist}(V,O)+w_{topo}f_{topo}(G)$. The w terms represent definable weighting factors for optionally choosing one function to be more critical to the process discussed below. The other terms of this potential are defined below.

Figure 4A:
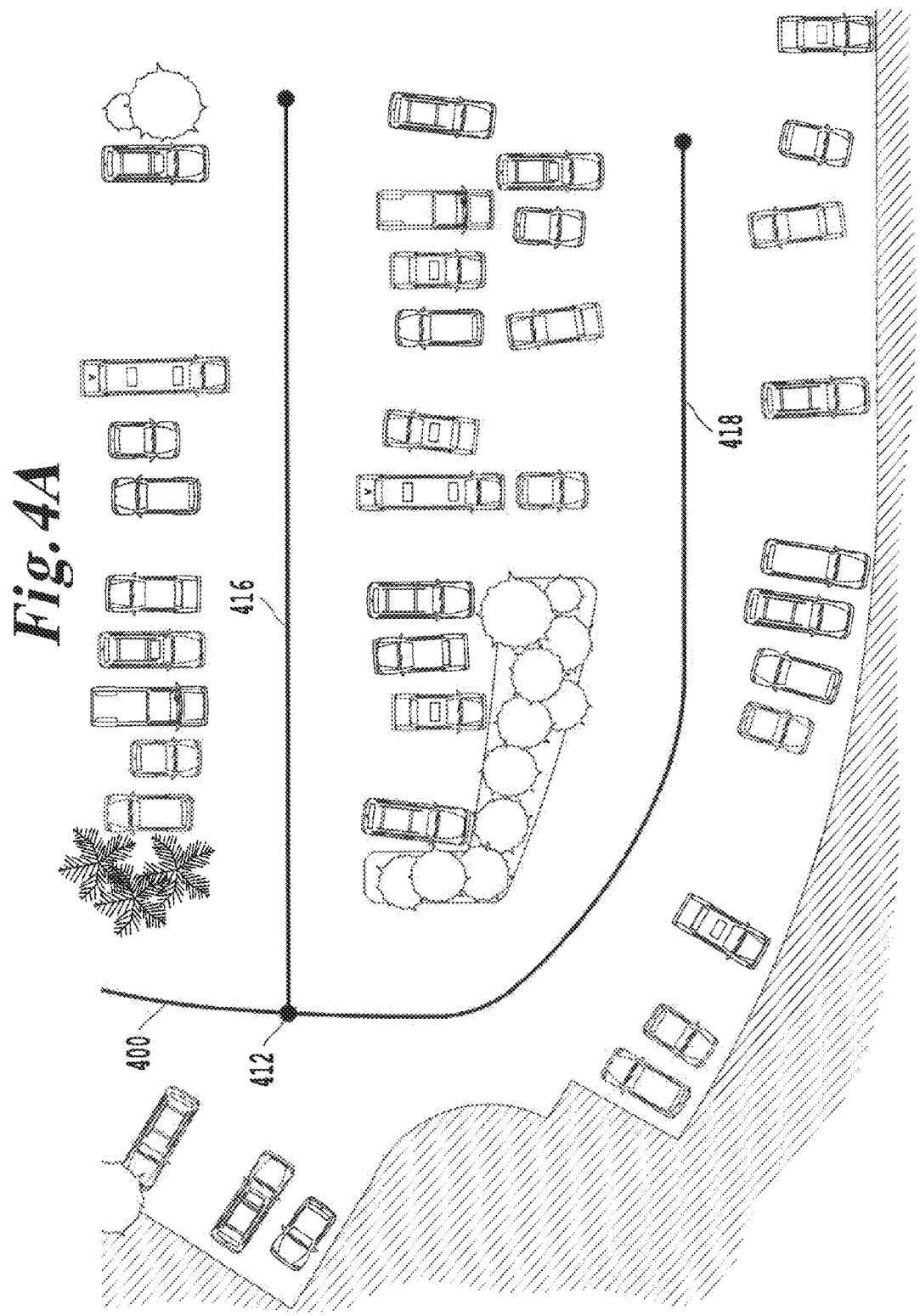
Figure 4B:
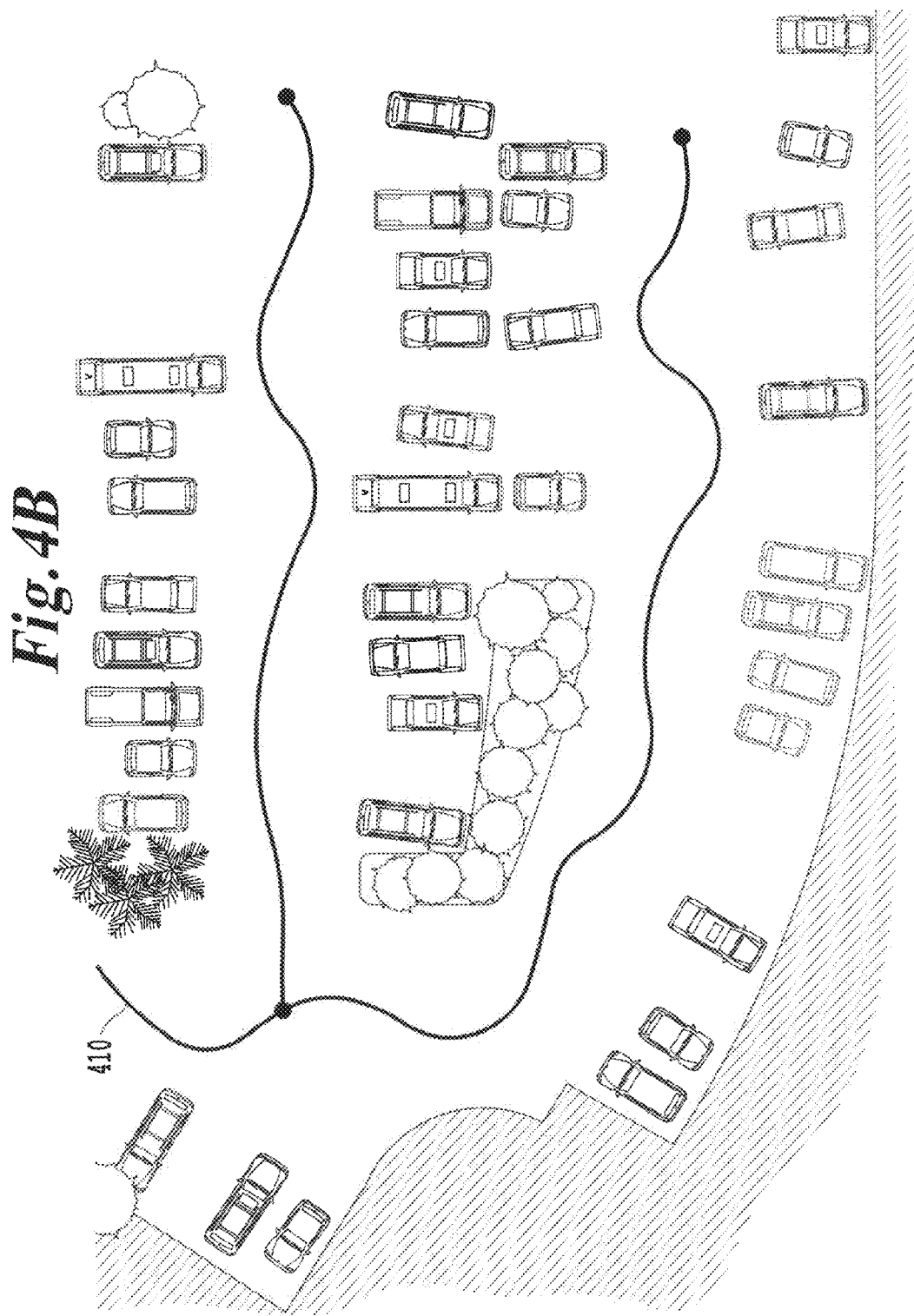

The term $f_{sm}(S)$ defines a prior or predetermined relationship on a smoothness of lane segments of the lane graph. In particular, this creates a bias towards graphs with smooth lane segments between intersections. For example, this term creates a bias that a smooth lane network 400 as illustrated in FIG. 4A is more likely than a jagged lane network 410 as illustrated in FIG. 4B.

The term $f_{in}(I)$ defines a prior on constraints between lane segments merging at an intersection. This term creates a bias that the three-way intersection 412 in FIG. 4a is more likely than the three-way intersection 414 in FIG. 4C.

Figure 4D:
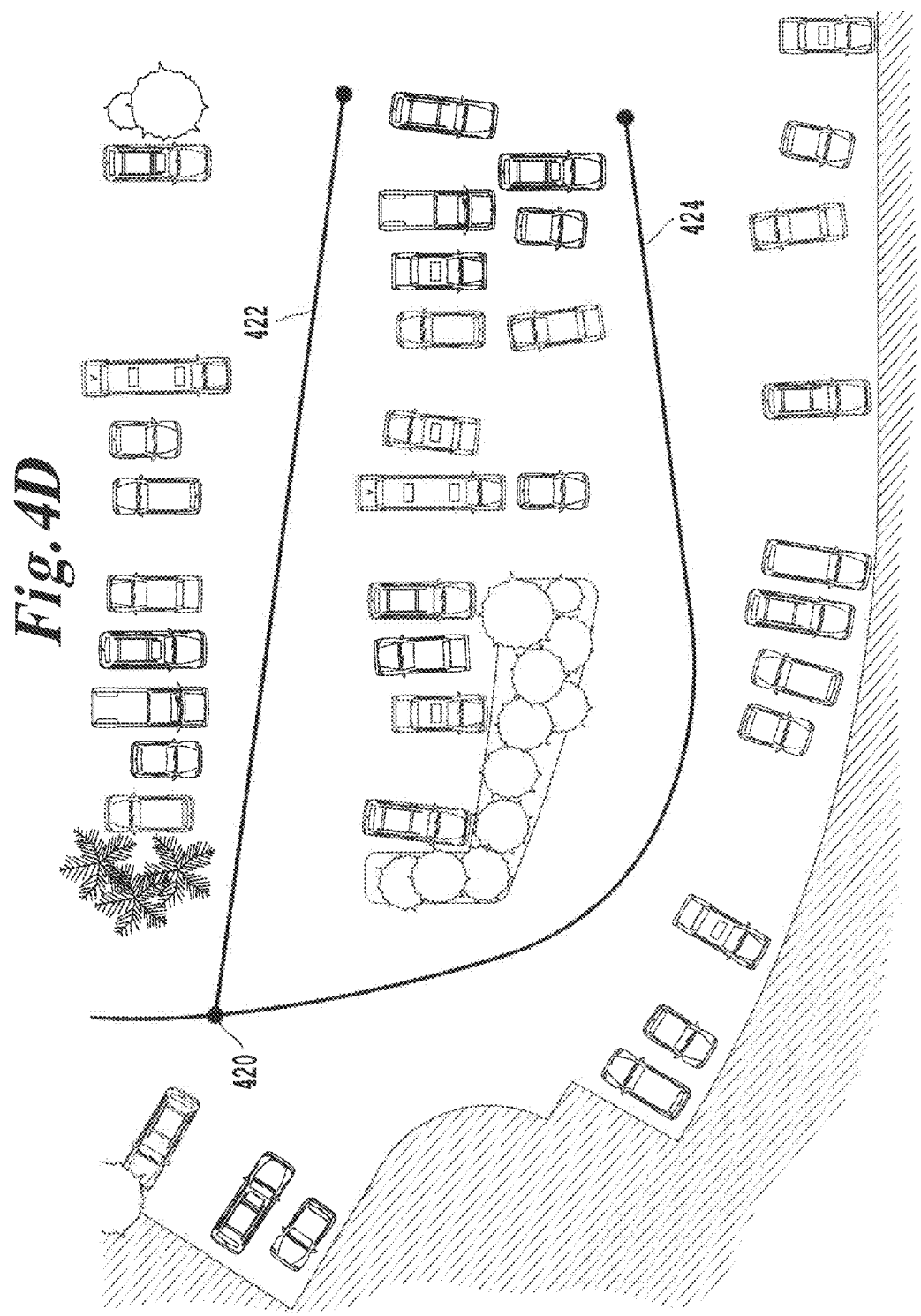

The term $f_{dir}(S,O)$ defines a directional alignment potential. In a typical driving environment, there is a preferred driving direction $\alpha_O(x,y)$ at any $\langle x,y \rangle$ location. The direction is typically aligned with environmental features such as roadside curbs, parked cars, etc., and is estimated using an observed obstacle map using a Markov-Random-Field (MRF) approach, as described in Dolgov et al., "Detection of principal directions in unknown environments for autonomous navigation," Proceedings of the Robotics: Science and Systems (RSS-08), Zurich, Switzerland, June 2008 (hereinafter referred to as Dolgov 2008). Dolgov 2008 is incorporated herein in its entirety by reference. The potential $f_{dir}(S,O)$ introduces a bias towards lane segments S aligned with a field of principal driving directions, corresponding to the observed obstacle map O. This term creates a bias that the positioning of the intersection 412 and the lanes 416 and 418 of FIG. 4A is a better match for the obstacle map than the position of the intersection 420 and the lanes 422 and 424 of FIG. 4D.

The term $f_{dist}(V,O)$ defines a potential on the distance of lane segments to obstacles, and includes a prior on typical road widths. For example, typical road widths vary between 9 and 12 feet per lane. Accordingly, this term assigns a low probability to the intersection 426 in FIG. 4E as a result of the proximity of the lane segment 428 to the obstacles 430.

The term $f_{topo}(G)$ corresponds to a prior on topologies of lane-network graphs. In particular, this term biases against an intersection cluster 432 shown in FIG. 4F as opposed to intersection 412 of FIG. 4A.

Then, f(G,O) is minimized, which is a complex modeling and computationally expensive optimization problem, because the optimization is over the space of all 2D graphs, which involves both continuous variables (coordinates of the nodes) and discrete variables (number of nodes and topology of the graph). In order to reduce the computational overhead and make the problem more tractable, it is preferred to make a simplifying assumption that the desired center-line graph is a homomorphism (continuous transformation) of a subset of the Generalized Voronoi Diagram (GVD) of the obstacle map. This is effective in environments where drivable lanes are separated by obstacles, e.g., parking lots where zones of parking spots are separated by curbs or parked cars. This assumption constrains the search to a neighborhood of the GVD and provides a starting point for estimating f(G,O).

Operating under this simplifying assumption, the process includes computing the GVD of the obstacle map and then iteratively transforming the corresponding graph in a gradient-descent manner. To further reduce computational overhead and make the optimization tractable, the following iterative procedure is performed, which includes applying discrete heuristic transformations to G, locally smoothing each edge of G, defining the intersection potential $f_{in}(I)$ on G, and globally smoothing by minimizing the sum of $f_{sm}(S)+f_{in}(I)+f_{dir}(I)+f_{dir}(S,O)+f_{dist}(V,O)+f_{topo}(G)$.

Applying discrete heuristic transformations to G includes using discrete variables which define the graph topology. Further, several heuristic transformations of the graph topology are considered and used with the effect of minimizing the topology potential $f_{topo}(G)$, given the current setting of continuous graph-node coordinates. In particular, several heuristic topology-transforming rules such as deleting edges, merging intersections, collapsing loops, etc., are applied if such rules lower the topology potential $f_{topo}(G)$. Then, each lane segment of G is locally smoothed while holding the intersections fixed.

The (dis)continuity potentials are then inferred across the intersections by locally smoothing each edge of G. In particular, by defining the intersection potential $f_{in}(I)$ on G, and globally smoothing. Then, a global continuous optimization problem is solved on the coordinates of the graph nodes which minimize the sum of the continuous potentials, $f_{sm}(S)+f_{in}(I)+f_{dir}(S,O)+f_{dist}(V,O)+f_{topo}(G)$.

Consider a graph $G=\langle V,E \rangle$ with vertices $V=\{x_i\}=\{\langle x_i, y_i \rangle\}$, intersections I, and lane segments S. Let N(i), i∈I be the set of neighbors of an intersection node, on which a smoothness potential is imposed, such as the local smoothing discussed above. Let $\Delta_{ij}=x_i-x_j$ be a vector between adjacent nodes i and j. Further, let $$\theta_i = \tan^{-1}\left(\frac{y_{i+1} - y_i}{x_{i+1} - x_i}\right),$$

i∈S be the tangential angle of a lane segment at node i, and let $\alpha_O(x_i)$ be the principal-direction angle at location $x_i$, inferred from the obstacle map O, as described in Dolgov 2008.

The continuous potentials are then defined as:

$$f_{sm}(S) = \sum_{i \in S} \|(x_{i+1} - x_i) - (x_i - x_{i-1})\|,$$

$$f_{in}(I) = \sum_{i \in I} \left\| \sum_{j,k \in N(i)} (\Delta_{ij} - \Delta_{ik}) \right\|,$$

$$f_{dir}(S, O) = \sum_{i \in S} \sin^2(2(\theta_i - \alpha_O(x_i))),$$

and $$f_{dist}(V, O) = \sum_{i \in V} (|x_i - o_i| - d_{max})^2,$$

where $o_i$ is the location of the obstacle from obstacle map O closest to $x_i$, and $d_{max}$ is a predetermined maximum road width.

Adverting back to FIGS. 3A-3D, FIG. 3A shows the raw GVD for the given obstacle map O. First, the topology of the graph 300 of FIG. 3A is modified by removing low-probability lane segments, collapsing some short loops, and merging nearby intersections. In particular, the two three-way intersections 432 of FIG. 3A are transformed into one four-way intersection 434 on FIG. 3B. This corresponds to applying discrete heuristic transformations to G, as previously discussed. Next, as an intermediate optimization step, each lane segment of the graph is smoothed independently (by minimizing $f_{sm}+f_{dist}$), while holding fixed the coordinates of all intersections, which results in the graph 310 of FIG. 3B. Given this locally-smoothed graph, the each intersection is then analyzed and the neighbor sets N(i) are constructed, where i∈I and k∈N(i), which defines an intersection prior $f_{in}$. This prior preserves segment continuity across some intersections and is discussed in more detail below. Then, a global optimization problem on the coordinates of all graph nodes is solved, resulting in the graph 320 shown in FIG. 3C. This iterative process continues until convergence of the centerline graph G, at which point the lane-network around G is estimated, leading to a lane network, such as lane network 330 shown in FIG. 3D.

Figure 5:
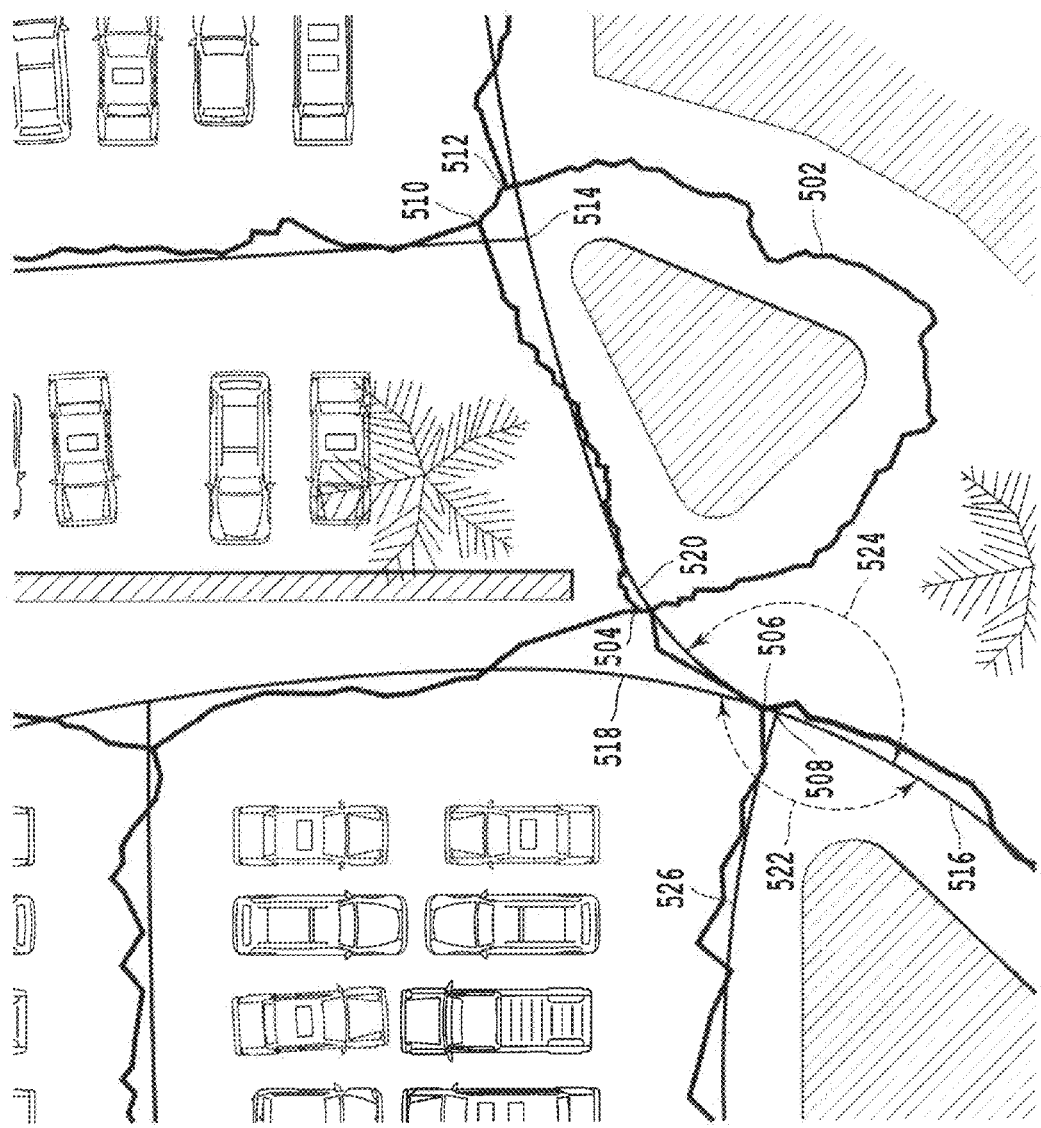
FIG. 5 illustrates an overlay of the statistical processing of FIGS. 3A-3D.

FIG. 5 further illustrates the above process by comparing a raw GVD to the output of the global optimization discussed above. In this example, heuristic topology transformations remove the edge 502, merge the three-way intersections 504 and 506 to the intersection 508, and merge the three-way intersections 510 and 512 to the intersection 514. After local lane-segment smoothing, an intersection prior is introduced, which imposes a smoothness potential between the edges 516 and 518 and the edges 516 and 520, marked by the arrows 522 and 524, respectively. The optimization also correctly preserves the intersection discontinuity between the edge 526 and the other edges connected to the intersection 508.

Both the local lane-segment optimization with fixed coordinates of intersection nodes and the global graph optimization are carried out using conjugate gradient descent, a very efficient numerical-optimization method. However, it should be appreciated that although conjugate gradient descent is preferred, other numerical-optimization methods can be used.

Figure 6:
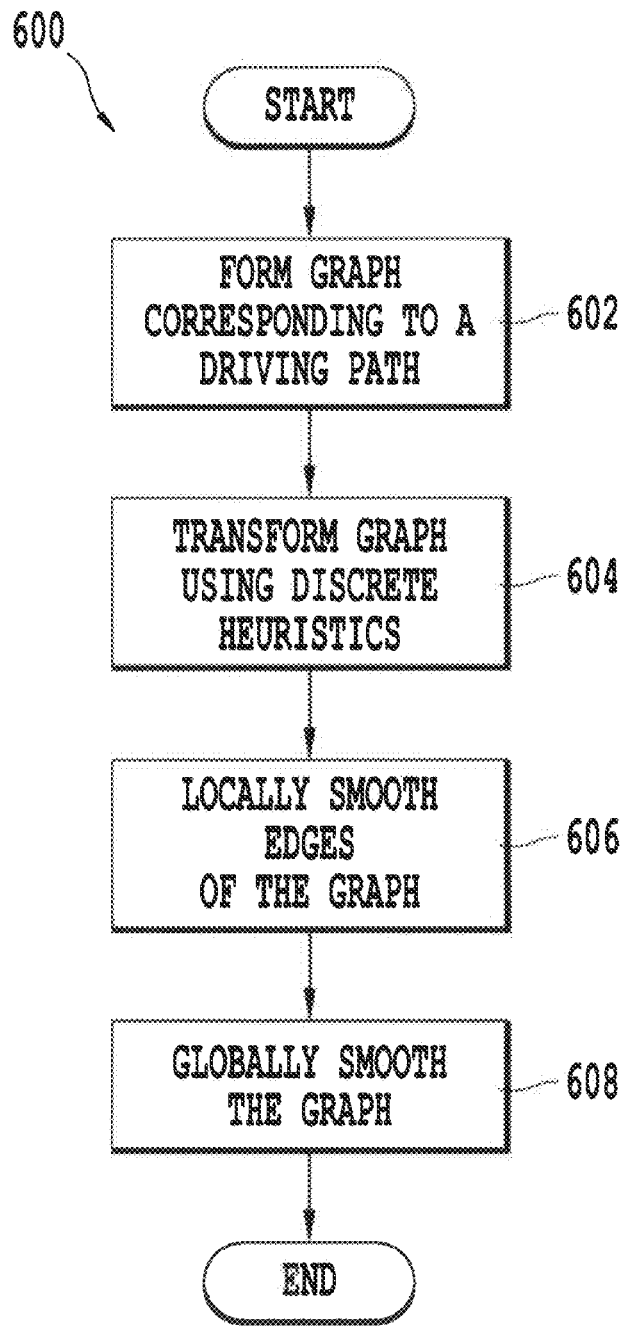
FIG. 6 shows a flowchart depicting a process in an embodiment of the invention.

According to an exemplary aspect of the present invention, the above-described process follows the flowchart 600 depicted in FIG. 6. The flowchart illustrates, sequentially, creating or using an obstacle-free diagram/path such as a GVD at step 602 to form a graph corresponding to a driving path, transforming the graph using discrete heuristics at step 604, locally smoothing edges of the graph at step 606, and then globally smoothing the graph at step 608.

Figure 7:
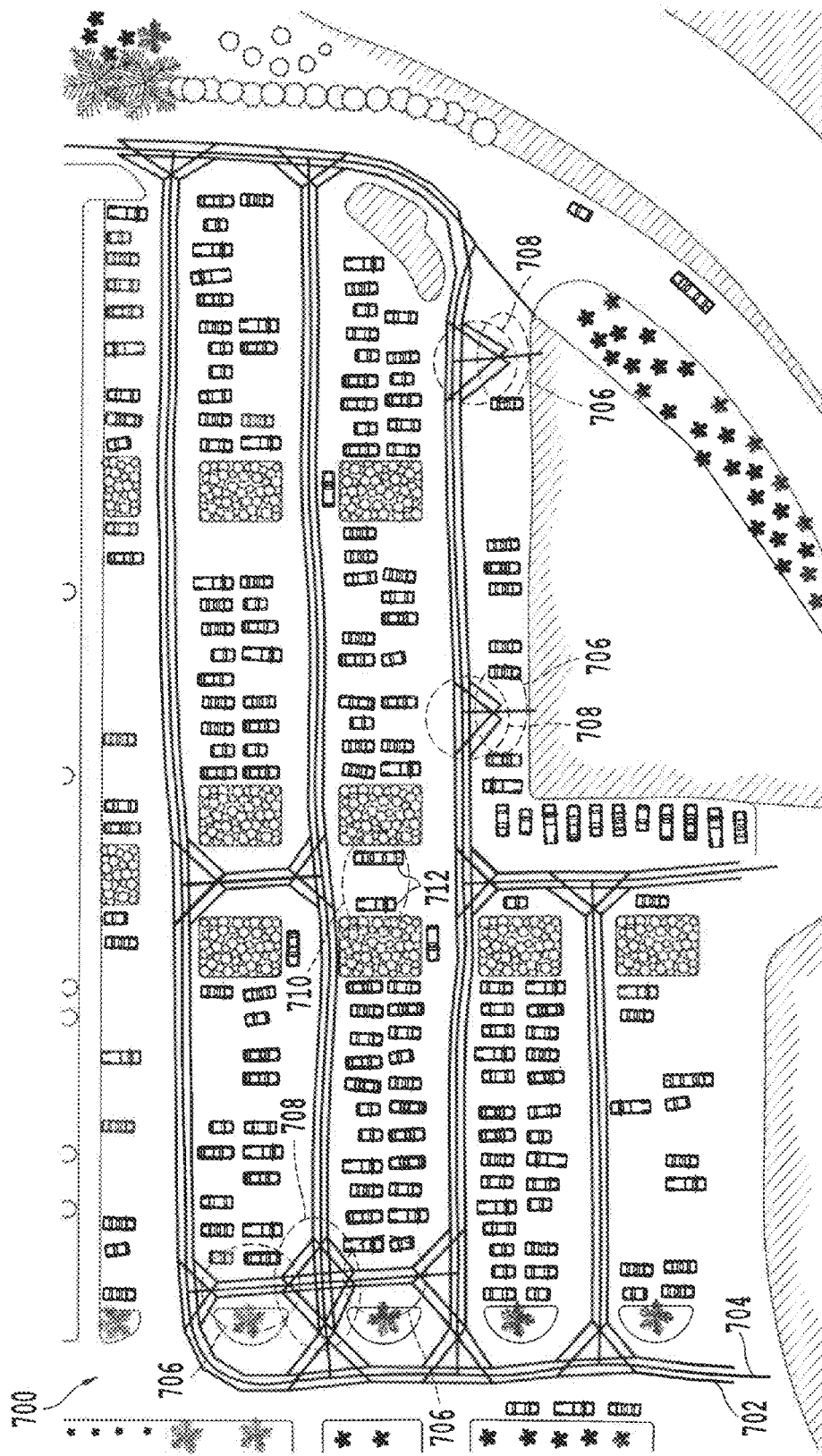
FIG. 7 illustrates processing errors from an automated system.

FIG. 7 illustrates an exemplary result of the above-described process of a semi-structured environment, a parking lot 700. FIG. 7 shows a lane network 702 as well as a processed GVD 704. Of note in FIG. 7 are several estimation errors. In particular, the process identified open parking space regions 706 as turning lanes, which resulted in identifying regions 708 as intersections. Further, the process failed to identify region 710 as a driving lane, partly because of the incorrectly parked vehicles 712 creating a lane therethrough which was too narrow.

Figure 8:
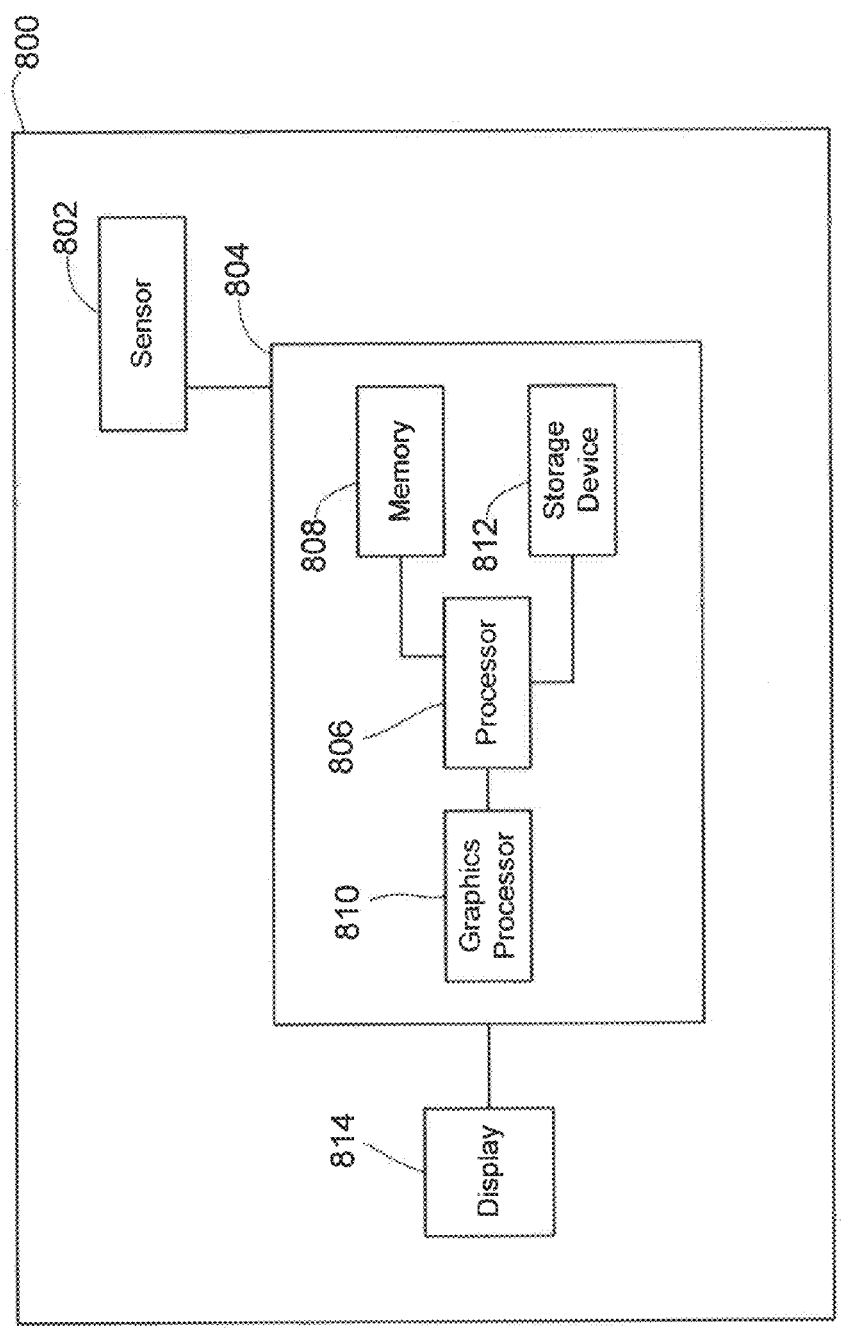
FIG. 8 depicts a block diagram of a vehicle and hardware according to an embodiment of the invention.

The errors discussed above are corrected, for example, by an operator after the above processing. In one particular aspect, as depicted in FIG. 8, the above process is performed onboard a vehicle 800 equipped with a 3D LiDAR sensor system 802 using a computing device 804 programmed in the C++ computer language. However, it should be appreciated the process could use any one of a plurality of computer languages. The computing device 804 preferably includes a processor 806 configured to process the above algorithm, random access electronic memory 808, a graphics processor 810 and a storage device 812, such as a hard disk drive or a solid-state drive, for electronically storing and retrieving a processed GVD and a corresponding lane network. In some aspects, an application specific integrated controller is also used. After a lane graph has been created, it is then displayed using a user-interfaced display 814, such as a touch-screen LCD display, and the graphics processor 810. The errors are then manually corrected by a user and subsequent navigations of the environment are performed autonomously without error. For instance, the LCD display preferably includes a touch-screen interface where lane segments and intersections can be selected and operations can be performed on the selected segments or intersections. In a preferably aspect, the operations include lane segment deletion and addition.

Alternatively, the errors are eliminated by using, e.g., road markings, to identify actual road widths and intersections. The road markings are visual or electronic markings, such as radio-frequency identification markings. The autonomous vehicle would then be equipped with sensors to read such markings and incorporate the readings into the obstacle map or a post-processed GVD.

Obviously, numerous modifications and variations of the present invention are possible in light of the above teachings. It is therefore to be understood that within the scope of the appended claims, the invention may be practiced otherwise than as specifically described herein.

The invention claimed is:

1. A method, comprising:
   creating an obstacle-free diagram using sensor data gathered from a topological sensor configured to detect obstacles within a surrounding environment;
   forming a graph from the obstacle-free diagram which corresponds to a driving path of the surrounding environment and recording the graph onto electronic memory of a computing device;
   transforming the graph using a processor of the computing device to apply discrete heuristic transformations to the graph;
   locally smoothing a plurality of edges of the graph using the processor after the transforming;
   globally smoothing the graph using the processor after the locally smoothing;
   creating a lane network corresponding to the graph after the globally smoothing by using a processor to create two lanes substantially equidistant and parallel to the graph; and
   displaying the lane network using a display device.

2. The method recited in claim 1, wherein the discrete heuristic transformations include deleting an edge of the graph, merging two intersections of the graph into a single intersection, and collapsing a plurality of edges forming a loop into a single edge.

3. The method recited in claim 1, wherein the locally smoothing includes smoothing a lane segment of the graph by minimizing a sum of a function of smoothness and a function of distance.

4. The method recited in claim 3, wherein the graph is defined as $G=\langle V, E \rangle$ having vertices V and edges E, where $V=\{x_i\}=\{\langle x_i, y_i \rangle\}$ and lane segments S∈V are a collection of connected nodes between two intersections of the graph, and the function of smoothness is defined as $$f_{sm}(S) = \sum_{i \in S} \|(x_{i+1} - x_i) - (x_i - x_{i-1})\|.$$

5. The method recited in claim 3, wherein the graph is defined as $G=\langle V, E \rangle$ having vertices V and edges E, where $V=\{x_i\}=\{\langle x_i, y_i \rangle\}$, $o_i$ is a location of an obstacle in an obstacle map 0 which is closest to a location x, on the graph, $d_{max}$ is a predetermined maximum road width, and the function of distance is defined as $$f_{dist}(V, O) = \sum_{i \in V} (|x_i - o_i| - d_{max})^2.$$

6. The method recited in claim 3, wherein the globally smoothing includes defining an intersection potential and minimizing a sum of the function of smoothness, the function of distance, a function of intersections and a function of direction.

7. The method recited in claim 1, wherein the obstacle-free diagram is a generalized Voronoi diagram.

8. A method, comprising:
creating an obstacle-free diagram using sensor data gathered from a topological sensor configured to detect obstacles within a surrounding environment;
forming a graph from the obstacle-free diagram which corresponds to a driving path of the surrounding environment and recording the graph onto electronic memory of a computing device;
transforming the graph using a processor of the computing device to apply discrete heuristic transformations to the graph;
locally smoothing a plurality of edges of the graph using the processor after the transforming; and
globally smoothing the graph using the processor after the locally smoothing, wherein
the locally smoothing includes smoothing a lane segment of the graph by minimizing a sum of a function of smoothness and a function of distance, and
the globally smoothing includes defining an intersection potential and minimizing a sum of the function of smoothness, the function of distance, a function of intersections and a function of direction.

9. The method recited in claim 8, wherein the graph has intersections I and neighbor sets N(i), where i∈I, k∈N(i), $\Delta_{ij}=x_i-x_j$ is a vector between adjacent nodes i and j, and the function of intersections is defined as $$f_{in}(I) = \sum_{i \in I} \left\| \sum_{j,k \in N(i)} (\Delta_{ij} - \Delta_{ik}) \right\|.$$

10. The method recited in claim 8, wherein the graph is defined as G=⟨V, E⟩ having vertices V and edges E, where V=[$x_i$]={⟨$x_i, y_i$⟩} and lane segments S∈V are a collection of connected nodes between two intersections of the graph, o, is a location of an obstacle in an obstacle map 0 which is closest to a location x, on the graph, $$\theta_i = \tan^{-1}\left(\frac{y_{i+1} - y_i}{x_{i+1} - x_i}\right),$$

is a tangential angle of a lane segment at node i where i∈S, $\alpha_O(x_i)$ is a principal-direction angle at the location $x_i$, and the function of direction is defined by $$f_{dir}(S, O) = \sum_{i \in S} \sin^2(2(\theta_i - \alpha_O(x_i))).$$

11. The method recited in claim 8, further comprising:
creating a lane network corresponding to the graph after the globally smoothing by using a processor to create two lanes substantially equidistant and parallel to the graph; and
displaying the lane network using a display device.

12. A method, comprising:
creating a graph corresponding to a driving path of an environment using an obstacle-free diagram corresponding a topology of the environment;
transforming the graph using a processor of a computing device to apply discrete heuristic transformations to the graph;
locally smoothing a plurality of edges of the graph using the processor after the transforming;
globally smoothing the graph using the processor after the locally smoothing;
creating a lane network corresponding to the graph after the globally smoothing by using a processor to create two lanes substantially equidistant and parallel to the graph; and
displaying the lane network using a display device.

13. The method recited in claim 12, wherein the discrete heuristic transformations include deleting an edge of the graph, merging two intersections of the graph into a single intersection, and collapsing a plurality of edges forming a loop into a single edge.

14. The method recited in claim 12, wherein the locally smoothing includes smoothing a lane segment of the graph by minimizing a sum of a function of smoothness and a function of distance.

15. The method recited in claim 14, wherein the globally smoothing includes defining an intersection potential and minimizing a sum of the function of smoothness, the function of distance, a function of intersections and a function of direction.

16. The method recited in claim 12, wherein the obstacle-free diagram is a generalized Voronoi diagram.

17. A method, comprising:
creating a graph corresponding to a driving path of an environment using an obstacle-free diagram corresponding a topology of the environment;
transforming the graph using a processor of a computing device to apply discrete heuristic transformations to the graph;
locally smoothing a plurality of edges of the graph using the processor after the transforming; and
globally smoothing the graph using the processor after the locally smoothing, wherein
the locally smoothing includes smoothing a lane segment of the graph by minimizing a sum of a function of smoothness and a function of distance, and
the globally smoothing includes defining an intersection potential and minimizing a sum of the function of smoothness, the function of distance, a function of intersections and a function of direction.

18. The method recited in claim 17, further comprising:
creating a lane network corresponding to the graph after the globally smoothing by using a processor to create two lanes substantially equidistant and parallel to the graph; and
displaying the lane network using a display device.

\* \* \* \* \*